C. A. KINGSBURY.
LINEMAN'S BLANKET.
APPLICATION FILED NOV. 17, 1919.

1,403,034.

Patented Jan. 10, 1922.

INVENTOR
CHARLES A. KINGSBURY
BY Benjamin, Roadhouse & Lundy
ATTYS.

UNITED STATES PATENT OFFICE.

CHARLES A. KINGSBURY, OF CHICAGO, ILLINOIS, ASSIGNOR TO F. A. HARDY & COMPANY, OF CHICAGO, ILLINOIS, A CORPORATION OF ILLINOIS.

LINEMAN'S BLANKET.

1,403,034.     Specification of Letters Patent.     Patented Jan. 10, 1922.

Application filed November 17, 1919. Serial No. 338,757.

*To all whom it may concern:*

Be it known that I, CHARLES A. KINGSBURY, a citizen of the United States, residing at Chicago, in the county of Cook and State of Illinois, have invented new and useful Improvements in a Lineman's Blanket, of which the following is a specification.

My present invention relates to improvements in blankets for electrical insulation.

The objects of my present invention are the provision of a readily attached and detached insulator suitable for the use of electrical linemen and others engaged in work upon or about electrical conductors. The excellent insulating properties of pure rubber and certain rubber composition are already well known, but as rubber, and the more suitable rubber compositions are of elastic nature and of considerable weight, insulating blankets, if made therefrom, are liable to stretch unevenly thereby forming areas where the material is reduced in thickness and also in insulating power. These areas are not noticeable in the ordinary use of the article which results in subjecting the user to a concealed and unknown danger when the conductors with which the article is used are carrying currents of high voltage. It is also desirable with such structures to provide means for easily, quickly and dependably attaching them in position.

I have endeavored to provide, in the hereinafter described and illustrated structure, an insulating blanket for electrical workers which will withstand in excess of ten thousand (10000) volts of current, which will not stretch with a consequent thinning of the structure and reduction of its insulating qualities, and which is so formed as to be readily and dependably attached in position.

I attain the above objects by means of the construction illustrated in the accompanying drawings, in which—

I prefer to embody my invention in a structure 36" x 36" square, although any other convenient dimensions may be employed.

Layers of pure rubber or rubber composition 4 constitute the two surface layers of the structure, and interposed between the surface layers 4 is a reinforcing fabric 5. The reinforcing fabric is terminated inside of the edges of the surface layers, and the portion of what may be regarded as the top surface layer, which extends beyond the interior fabric reinforcement, is, preferably, formed into a raised convexed peripheral bead 6. The structure so formed is then vulcanized into an integral piece.

Figure 1:
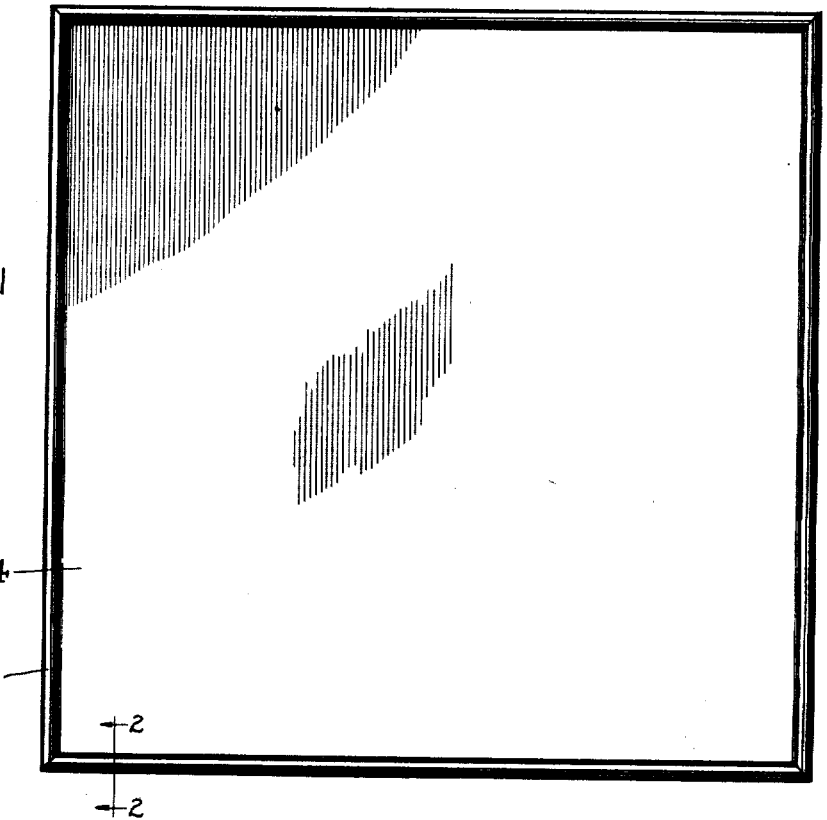
Figure 1 is a plan of an insulating blanket embodying my invention.
Figure 2:
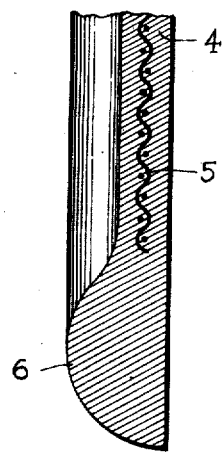
Figure 2 is a section through the edge thereof disclosing the means for readily and dependably securing it in position, and drawn to an enlarged scale.
Figure 3:
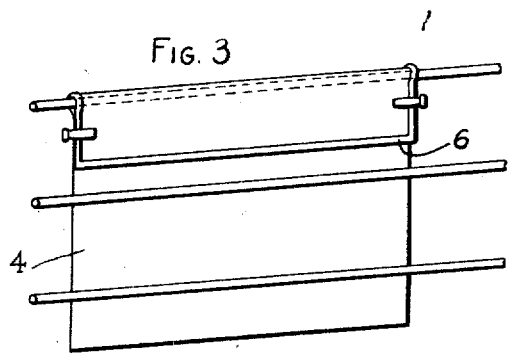
Figure 3 is a view showing the manner of securing the blanket to one or more electrical conductors.

The interior fabric reinforcement 5 prevents the stretching or the distortion of the surface layers and also permits the use of much thicker surface layers of rubber or rubber composition. By terminating the central interior fabric reinforcement within the edges of the surface layers, the edges of the fabric are protected against raveling or abrasion and also from access of water or moisture thereto which would tend to permit of its distortion. The provision of the pure rubber or rubber composition thickened beaded edges tends to prevent the sparking of the current around the edge, and also affords special facilities for engagement by a clip of any suitable construction, or an ordinary clothes-pin, as shown in Figure 3 of the drawings.

It will be readily appreciated that the structure heretofore illustrated and described, provides an insulator which may be readily attached or detached so as to afford a maximum of protection to a workman employed about electrical conductors; that the structure will not develop thin places where the insulating power is materially reduced, and that the beaded edges of the structure not only contributes to its durability but also increases its insulating properties and renders it easy of attachment in the desired position.

The unreinforced pure rubber or rubber composition edges also increases the flexibility of the edges which permit of it being more easily folded about the structure to which it is secured.

Having described my invention, what I claim as new and desire to secure by Letters Patent is:

1. An attachable and detachable electrical insulator comprising surface layers of vulcanizable material, an interior fabric reinforcement interposed and vulcanized between said surface layers; said fabric reinforcement layer terminating within the edges of said surface layers and the edges of said surface layers extending beyond said fabric reinforcement being provided with a peripheral bead.

2. An attachable and detachable electrical insulator comprising surface layers of rubber, an interior fabric reinforcement interposed and vulcanized between said surface layers; said fabric reinforcement layer terminating within the edges of said surface layers and the edges of said surface layers extending beyond said fabric reinforcement being provided with a peripheral bead.

3. An attachable and detachable electrical insulator comprising surface layers of rubber composition, an interior fabric reinforcement interposed and vulcanized between said surface layers; said fabric reinforcement layer terminating within the edges of said surface layers and the edges of said surface layers extending beyond said fabric reinforcement being provided with a peripheral bead.

4. An attachable and a detachable electric insulator comprising surface layers of rubber composition, interior fabric reinforcements interposed and vulcanized between said surface layers; said fabric reinforcement layers terminating within the edges of said surface layers and the edges of said surface layers being superficially extended above the surface of the body of the insulator.

Signed at Chicago, county of Cook, and State of Illinois, this 15th day of November, 1919.

CHARLES A. KINGSBURY.

Witnesses:
B. A. WEEKS,
E. K. LUNDY, Jr.